(12) United States Patent
Kai (10) Patent No.: US 11,298,823 B2
(45) Date of Patent: Apr. 12, 2022

(54) SENSOR DEVICE AND SENSING METHOD

(71) Applicant: SONY CORPORATION, Tokyo (JP)

(72) Inventor: Toshimitsu Kai, Kanagawa (JP)

(73) Assignee: SONY CORPORATION, Tokyo (JP)

( * ) Notice: Subject to any disclaimer, the term of this patent is extended or adjusted under 35 U.S.C. 154(b) by 138 days.

(21) Appl. No.: 16/763,547

(22) PCT Filed: Aug. 24, 2018

(86) PCT No.: PCT/JP2018/031336
§ 371 (c)(1),
(2) Date: May 12, 2020

(87) PCT Pub. No.: WO2019/102672
PCT Pub. Date: May 31, 2019

(65) Prior Publication Data
US 2020/0361085 A1   Nov. 19, 2020

(30) Foreign Application Priority Data
Nov. 21, 2017   (JP) .............................. JP2017-223585

(51) Int. Cl.
*H02P 6/28*  (2016.01)
*B25J 9/16*  (2006.01)
*B25J 13/08*  (2006.01)

(52) U.S. Cl.
CPC ........... *B25J 9/1633* (2013.01); *B25J 9/1674* (2013.01); *B25J 13/085* (2013.01); *H02P 6/28* (2016.02)

(58) Field of Classification Search
CPC ...... B25J 13/085; B25J 9/1633; B25J 9/1674; H02P 6/182; H02P 6/28
See application file for complete search history.

(56) References Cited

U.S. PATENT DOCUMENTS 5,047,700 A  *  9/1991  Szakaly .............. G05B 19/427
                                                             318/568.1
8,909,373 B2 * 12/2014  Bjorn ..................... B25J 9/1676
                                                             700/253
(Continued)

FOREIGN PATENT DOCUMENTS

JP  59-067435 A   4/1984
JP  63-099193 A   4/1988
(Continued)

OTHER PUBLICATIONS

International Search Report and Written Opinion of PCT Application No. PCT/JP2018/031336, dated Nov. 27, 2018, 08 pages ISRWO.

*Primary Examiner* — Thai T Dinh
(74) *Attorney, Agent, or Firm* — Chip Law Group (57) ABSTRACT

A sensor device and a sensing method capable of detecting even a small external force are provided. A sensor device includes: a backflow prevention unit provided in the middle of a circuit that supplies a current from a power supply unit to a motor unit; a potential detection unit configured to detect each of potentials at a preceding stage and a subsequent stage of the backflow prevention unit; and an external force detection unit configured to detect an external force applied to a member connected to the motor unit on the basis of the potentials at the preceding stage and the subsequent stage of the backflow prevention unit.

16 Claims, 7 Drawing Sheets

(56) References Cited

U.S. PATENT DOCUMENTS

| | | | |
|---|---|---|---|
| 2007/0229015 A1* | 10/2007 | Yoshida | B25J 9/1676 |
| | | | 318/568.21 |
| 2016/0250750 A1* | 9/2016 | Kuroshita | B25J 9/1674 |
| | | | 700/253 |
| 2019/0192238 A1* | 6/2019 | Tsuboi | B25J 9/1633 |

FOREIGN PATENT DOCUMENTS

| | | |
|---|---|---|
| JP | 06-090584 A | 3/1994 |
| JP | 08-263143 A | 10/1996 |
| JP | 2014-004985 A | 1/2014 |

\* cited by examiner

SENSOR DEVICE AND SENSING METHOD

CROSS REFERENCE TO RELATED APPLICATIONS

This application is a U.S. National Phase of International Patent Application No. PCT/JP2018/031336 filed on Aug. 24, 2018, which claims priority benefit of Japanese Patent Application No. JP 2017-223585 filed in the Japan Patent Office on Nov. 21, 2017. Each of the above-referenced applications is hereby incorporated herein by reference in its entirety.

TECHNICAL FIELD

The present disclosure relates to a sensor device and a sensing method.

BACKGROUND ART

In recent years, mechanical devices (so-called robotic devices) have become widespread which make motions that resemble human movements using an electric or magnetic action. For example, in the industrial field, industrial robots such as manipulators and transfer robots that automate production operations have been widely used. Furthermore, in the daily life field, life-connected type support robots have been used which support daily activities of users.

In such a mechanical device, multiple links connected to joints are driven by motors in concert with one another to realize a complicated motion.

For example, Patent Document 1 below discloses a crawler device which includes a pair of left and right first crawlers (endless tracks), second crawlers that extend linearly forward from front ends of the first crawlers, and swing motors that swing the second crawlers with respect to the first crawlers. Such a crawler device can freely move up and down stairs, steps, or the like by determining contact between the second crawlers and ground plane, and freely rotating the second crawlers with respect to the first crawlers.

Furthermore, Patent Document 1 discloses that contact between the second crawlers and the ground plane can be determined without using an attitude sensor or image processing by detecting, with an encoder, the rotation of contact detection crawlers provided on side surfaces of the second crawlers in a lateral direction thereof.

CITATION LIST

Patent Document

Patent Document 1: Japanese Patent Application Laid-Open No. 2014-4985

SUMMARY OF THE INVENTION

Problems to be Solved by the Invention

However, the technique described in Patent Document 1 above has difficulty in detecting gentle contact that does not change an encoder output. Furthermore, in order to determine whether or not a change in the encoder output is due to contact, it is necessary to calculate the acceleration of the change in the encoder output, but an S/N ratio decreases in the process of calculating the acceleration, so that detection sensitivity decreases. Therefore, it is difficult to detect gentle contact with the technique described in Patent Document 1 above.

Accordingly, there has been a demand for a sensor device and a sensing method capable of detecting even a small external force generated by gentle contact.

Solutions to Problems

According to the present disclosure, a sensor device is provided which includes: a backflow prevention unit provided in the middle of a circuit that supplies a current from a power supply unit to a motor unit; a potential detection unit configured to detect each of potentials at a preceding stage and a subsequent stage of the backflow prevention unit; and an external force detection unit configured to detect an external force applied to a member connected to the motor unit on the basis of the potentials at the preceding stage and the subsequent stage of the backflow prevention unit.

Furthermore, according to the present disclosure, a sensing method is provided which includes: detecting each of potentials at a preceding stage and a subsequent stage of a backflow prevention unit provided in the middle of a circuit that supplies a current from a power supply unit to a motor unit; and detecting an external force applied to a member connected to the motor unit on the basis of the potentials at the preceding stage and the subsequent stage of the backflow prevention unit.

According to the present disclosure, a back electromotive force of a motor generated by an external force can be detected by converting the back electromotive force into a potential difference between a preceding stage and a subsequent stage of the backflow prevention unit. Because the potential difference between the preceding stage and the subsequent stage of the backflow prevention unit is a time-integrated value of a current generated by the back electromotive force of the motor, it is possible to detect even a current caused by a small back electromotive force generated by a small external force.

Effects of the Invention

As described above, according to the present disclosure, a sensor device and a sensing method capable of detecting even a small external force are provided.

Note that the effects described above are not necessarily limited, and any of the effects shown in the present description, or other effects that can be known from the present description may be achieved together with or in place of the effects described above.

MODE FOR CARRYING OUT THE INVENTION

Hereinafter, a preferred embodiment of the present disclosure will be described in detail with reference to the accompanying drawings. Note that in the present description and drawings, the same reference numeral is added to components having substantially the same functional configuration, and repeated descriptions thereof will be omitted.

Note that the descriptions will be made in the following order.

1. Overview
2. Example of configuration
3. Specific example
4. Control examples
4.1. First control example
4.2. Second control example
5. Examples of application <1. Overview>

Figure 1:
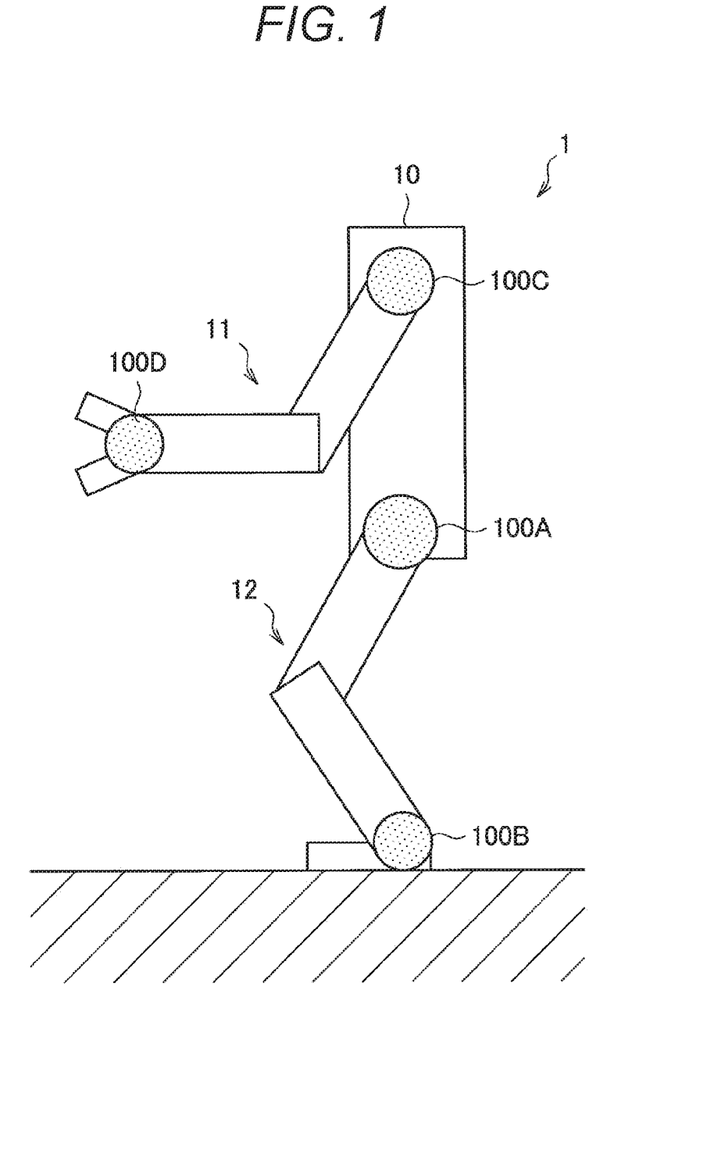
FIG. 1 is a schematic diagram illustrating an example of a robotic device to which a sensor device according to an embodiment of the present disclosure can be applied.

First, an overview of a sensor device according to an embodiment of the present disclosure will be described with reference to FIG. 1. FIG. 1 is a schematic diagram illustrating an example of a robotic device to which the sensor device according to the present embodiment can be applied.

As illustrated in FIG. 1, for example, a robotic device 1 includes a torso portion 10, and an arm portion 11 and a leg portion 12 connected to the torso portion 10.

The arm portion 11 is configured with, for example, a plurality of links and a joint which connects each of the links. The arm portion 11 includes joints 100C and 100D each driven by a motor, and the arm portion 11 is rotatably connected to the torso portion 10 by the joint 100C. The leg portion 12 is configured with, for example, a plurality of links and a joint which connects each of the links. The leg portion 12 includes joints 100A and 100B each driven by a motor, and the leg portion 12 is rotatably connected to the torso portion 10 by the joint 100A. The robotic device 1 can execute a motion indicated by a user by controlling the rotation of each of the joints 100A, 100B, 100C, and 100D with a torque output from each motor.

Here, in order to appropriately control the motion of the robotic device 1, it is important to detect the presence or absence of contact between the robotic device 1 and an external environment such as an object acted on by the arm portion 11, or ground plane contacted by the leg portion 12. Particularly in life-connected type support robots that support daily activities of users, many unsteady motions occur in variable living environments of the users. In such a case, it is particularly important to reduce the occurrence of unexpected contact or collision between the robotic device 1 and the external environment in order to reduce influence on the external environment or the occurrence of malfunction of the robotic device 1.

For example, as an example of a method of detecting the presence or absence of contact between the arm portion 11 or the leg portion 12 and the external environment in the robotic device 1, it is conceivable that a force sensor that detects contact or collision is installed at a tip of the arm portion 11 or the leg portion 12.

In such a case, however, because the force sensor to which an excessive external force is possibly applied is provided in a robust structure, the size and the mass of the force sensor increase, which results in an enlarged force sensor. Therefore, the arm portion 11 or the leg portion 12 provided with the force sensor is also enlarged, so that there is a possibility that the driving range and performance of the arm portion 11 or the leg portion 12 are reduced, and power consumption is increased. Furthermore, in a case where a force sensor having a large upper limit of an allowable load is used in consideration of the possibility that the excessive external force is applied, the resolution of the force sensor is reduced, and therefore the detection accuracy for a small external force is reduced.

Furthermore, as another example of the method of detecting the presence or absence of contact between the arm portion 11 or the leg portion 12 and the external environment in the robotic device 1, it is conceivable that an encoder that detects rotational positions is provided to a motor which drives the joint of the arm portion 11 or the leg portion 12.

In such a case, however, in order to detect the contact between the arm portion 11 or the leg portion 12 and the external environment from an output of the encoder, it is necessary to calculate the acceleration of motor rotation by second-order differentiation of the encoder output. Because the acceleration of the motor rotation thus calculated includes noise increased by the second-order differentiation, it has been difficult to detect, from the encoder output, a small change in acceleration that is easily buried in the noise. Furthermore, because there is a possibility that gentle contact with the external environment does not appear as a change in the encoder output as a result of being absorbed by mechanical engagement such as backlash, it has been difficult to detect, from the encoder output, such gentle contact between the arm portion 11 or the leg portion 12 and the external environment.

Moreover, as another example of the method of detecting the presence or absence of contact between the arm portion 11 or the leg portion 12 and the external environment in the robotic device 1, it is conceivable that a current value of a motor that rotates a joint is detected, the current value increasing with an increase in a load caused by contact.

In such a case, however, a high-precision current sensor is required to detect a small increase in a current value due to gentle contact. On the other hand, because the motor uses large currents, the current sensor is also required to have a wide dynamic range that can withstand the large currents. It is extremely difficult to realize such a current sensor having a wide dynamic range and capable of detecting a small current.

Furthermore, the increase in the current value of the motor due to the load by contact occurs in a case where the arm portion 11 or the leg portion 12 is position-controlled, and does not occur in a case where the arm portion 11 or the leg portion 12 is torque-controlled. This is because in a case where the arm portion 11 or the leg portion 12 is torque-controlled, a value of a current to be supplied to the motor that rotates the joint is controlled depending on the torque. Therefore, it is difficult to detect contact by detecting the current value of the motor that rotates the joint in the arm portion 11 or the leg portion 12 that is torque-controlled. Particularly in life-connected type support robots that support daily activities of users, torque control is often used which can control a force exerted by the arm portion 11 or the leg portion 12 in order to increase the safety to the users and the external environment. Therefore, there has been a strong demand for means for detecting contact between the arm portion 11 or the leg portion 12 to be torque-controlled and the external environment in such life-connected type support robots that support daily activities of users.

The present inventors have considered the above circumstances, and have arrived at a technique according to the present disclosure. The sensor device according to an embodiment of the present disclosure is a sensor device that detects an external force applied to the arm portion 11 or the leg portion 12 of the robotic device 1 by providing a backflow prevention unit in the middle of a circuit that supplies a current from a power supply to a motor, and detecting each of potentials at a preceding stage and a subsequent stage of the backflow prevention unit.

Specifically, in a case where an external force is applied to the arm portion 11 or the leg portion 12, a back electromotive force is generated, in a motor that drives the joint of the arm portion 11 or the leg portion 12, by the motor rotated by the external force, and the generated back electromotive force becomes a current flowing toward the power supply to be regenerated. The sensor device according to the present embodiment includes the backflow prevention unit that blocks a current flowing from the motor to the power supply in a circuit between the power supply and the motor, thereby blocking a current generated by the back electromotive force, and performing conversion into a potential difference between the preceding stage and the subsequent stage of the backflow prevention unit. Therefore, by detecting each of the potentials at the preceding stage and the subsequent stage of the backflow prevention unit, the sensor device can detect the back electromotive force generated in the motor, and can detect the external force applied to the arm portion 11 or the leg portion 12.

Note that, in the present description, the preceding stage and the subsequent stage are defined on the basis of the direction of the current flowing when the motor is driven. Specifically, an upstream side of the current flowing from the power supply to the motor when the motor is driven is referred to as a preceding stage, and the downstream side thereof is referred to as a subsequent stage.

Figure 2A:
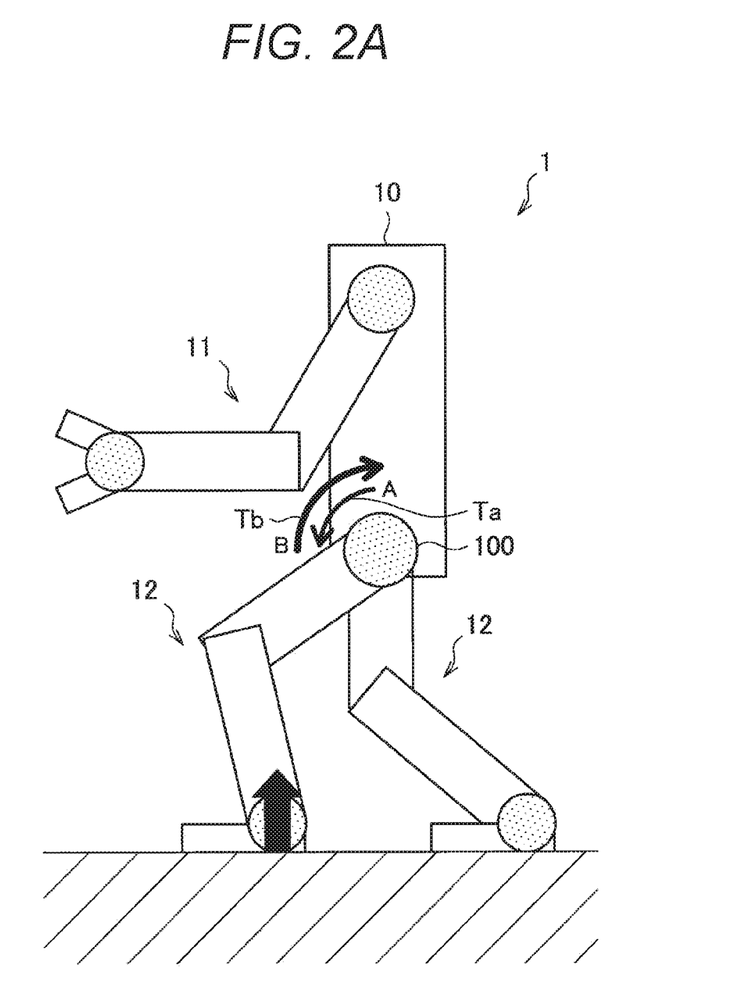
FIG. 2A is a schematic diagram illustrating how an external force is applied in a case where a leg portion contacts the ground by walking of the robotic device.

Here, with reference to FIGS. 2A and 2B, a flow of external force detection by the sensor device according to the present embodiment will be described more specifically. FIG. 2A is a schematic diagram illustrating how an external force is applied in a case where the leg portion contacts the ground by walking of the robotic device, and FIG. 2B is a schematic diagram illustrating how an external force is applied in a case where the robotic device collides with a user.

For example, as illustrated in FIG. 2A, in a case where the robotic device 1 illustrated in FIG. 1 walks by alternately driving the leg portions 12, a reaction force corresponding to the weight of the robotic device 1 acts on the leg portion 12 of the robotic device 1 from the ground plane. Therefore, in a case where the robotic device 1 walks, in addition to a torque A which drives the leg portion 12 for walking, a torque B by the reaction force from the ground plane in a direction opposite to the torque A is applied to the joint 100 connecting the leg portion 12 and the torso portion 10.

Here, in a case where a magnitude Tb of the torque B is larger than a magnitude Ta of the torque A, the motor included in the joint 100 functions as a generator and generates a back electromotive force. By blocking a current caused by the back electromotive force generated in the motor by the backflow prevention unit between the motor and the power supply, the sensor device according to the present embodiment can convert the back electromotive force into an increase in a potential on a motor side (subsequent stage) of the backflow prevention unit. Consequently, the sensor device according to the present embodiment can detect an external force from the ground plane (that is, contact between the leg portion 12 connected to the joint 100 and the ground plane) by detecting the increase in the potential at the subsequent stage of the backflow prevention unit.

Figure 2B:
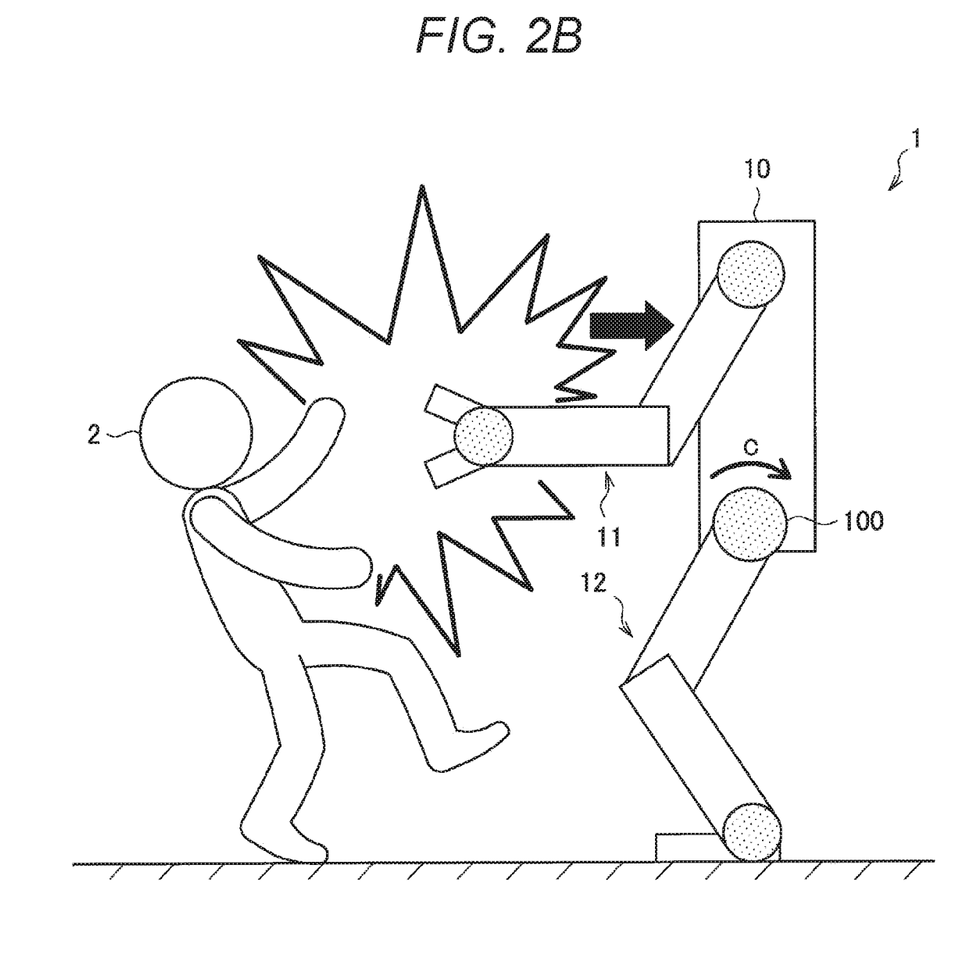
FIG. 2B is a schematic diagram illustrating how an external force is applied in a case where the robotic device collides with a user.

Furthermore, for example, as illustrated in FIG. 2B, in a case where the robotic device 1 illustrated in FIG. 1 collides with a user 2, an external force by the collision acts on each of the torso portion 10, the arm portion 11, and the leg portion 12 of the robotic device 1. Furthermore, a torque caused by the external force of the collision is applied to respective joints that connect the torso portion 10, the arm portion 11, and the leg portion 12 of the robotic device 1. For example, a torque C is applied to the joint 100 that connects the torso portion 10 and the leg portion 12.

At that time, a motor included in the joint 100 rotated by the torque C by the external force functions as a generator and generates a back electromotive force. By blocking a current caused by the back electromotive force generated in the motor by the backflow prevention unit between the motor and the power supply, the sensor device according to the present embodiment can convert the back electromotive force into an increase in a potential on a motor side (subsequent stage) of the backflow prevention unit. Consequently, the sensor device according to the present embodiment can detect an external force applied to the robotic device 1 (that is, a collision between the robotic device 1 and the user or the external environment) by detecting the increase in the potential at the subsequent stage of the backflow prevention unit.

In the sensor device according to the present embodiment, an external force applied to a link or the like connected to a joint is converted into a back electromotive force in a motor, and the converted back electromotive force can be detected as a potential difference between the preceding stage and the subsequent stage of the backflow prevention unit. Consequently, the sensor device can detect a small external force generated by gentle contact as a potential difference obtained by time-integrating a current caused by the back electromotive force, and thus can improve detection sensitivity to the contact.

<2. Example of Configuration>

Figure 3:
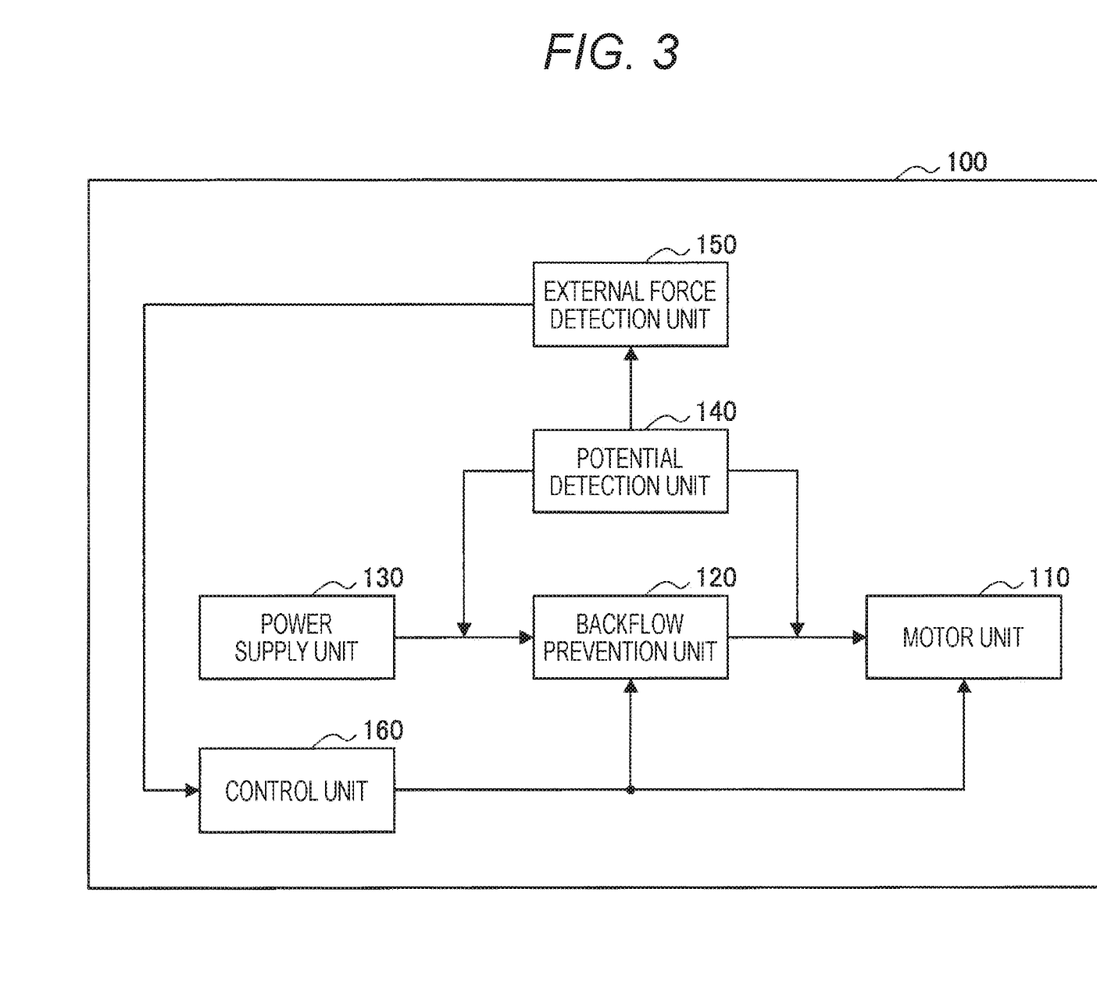
FIG. 3 is a block diagram illustrating an example of an internal configuration of a joint including the sensor device according to the embodiment.

Next, an example of a configuration of a joint including the sensor device according to the present embodiment will be described with reference to FIG. 3. FIG. 3 is a block diagram illustrating an example of an internal configuration of the joint including the sensor device according to the present embodiment.

As illustrated in FIG. 3, the joint 100 includes, for example, a power supply unit 130, a motor unit 110, a backflow prevention unit 120, a potential detection unit 140, an external force detection unit 150, and a control unit 160. The sensor device according to the present embodiment can include, for example, the backflow prevention unit 120, the potential detection unit 140, and the external force detection unit 150.

The power supply unit 130 supplies electric power to the motor unit 110 that drives the joint 100. Specifically, the power supply unit 130 includes a power supply that supplies electric power, and a control circuit for controlling the power supply. For example, the power supply unit 130 may include a storable direct-current power supply in order to regenerate a back electromotive force generated in the motor unit 110, or the power supply unit 130 may include a battery or a capacitor. Consequently, the power supply unit 130 can regenerate the back electromotive force generated in the motor unit 110, and can use the regenerated back electromotive force as a part of electric power to be supplied to the motor unit 110.

Note that the power supply unit 130 may include therein another power supply (for example, an alternating-current power supply and the like) in addition to the storable direct-current power supply. Furthermore, the power supply unit 130 may include an interface (for example, an outlet plug and the like) that sources electric power from an external power supply in addition to the storable direct-current power supply. For example, the power supply unit 130 may include an interface that sources electric power to be supplied to the motor unit 110 from a power supply provided inside or outside the robotic device 1.

The motor unit 110 converts electric energy supplied from the power supply unit 130 into mechanical energy. Specifically, the motor unit 110 includes a motor that converts supplied electric power into motive power, and a control circuit that controls the motor. For example, the motor unit 110 may include an electric motor that converts electric power into rotary motion using an interaction between a magnetic field and a current (that is, Lorentz force). Note that in a case where the motor unit 110 is rotated by a torque supplied from the outside, the motor unit 110 functions as an engine that reversely converts supplied motive power to electric power. For example, the motor unit 110 may include either a direct-current motor or an alternating-current motor. Specifically, the motor unit 110 may include a three-phase alternating-current motor. Three-phase alternating-current motors are widely used, and various types thereof can be easily obtained. Consequently, the motor unit 110 can include a motor that outputs an appropriate torque dependent on the size of a link or the like connected to the joint 100.

The backflow prevention unit 120 is provided in the middle of a circuit that supplies a current from the power supply unit 130 to the motor unit 110, and prevents the current from flowing from the motor unit 110 to the power supply unit 130. Specifically, the backflow prevention unit 120 is a circuit that includes an element having an action of flowing a current in only one direction (also referred to as a rectifying action). For example, the backflow prevention unit 120 may be a circuit that includes an element having a rectifying action such as various diodes, a thyristor, or a metal-oxide-semiconductor field-effect transistor (MOS-FET). The backflow prevention unit 120 generates a potential difference between the preceding stage and the subsequent stage of the backflow prevention unit 120 by blocking, in the middle of the circuit, a current caused by a back electromotive force generated by the motor unit 110 rotated by an external force. That is, the backflow prevention unit 120 can increase the potential at the subsequent stage of the backflow prevention unit 120 by the back electromotive force generated in the motor unit 110.

Furthermore, the backflow prevention unit 120 may be provided so as to be able to control the presence or absence of the rectifying action. Specifically, the backflow prevention unit 120 may be provided so as to be able to perform switching between the presence and absence of the rectifying action by including a switch for switching a circuit, or a control terminal. Because the potential at the subsequent stage of the backflow prevention unit 120 continues to increase due to the accumulation of the back electromotive force in the motor unit 110, if the potential difference between the preceding stage and the subsequent stage of the backflow prevention unit 120 becomes excessively large, there is a possibility that a breakdown voltage is exceeded and the backflow prevention unit 120 breaks down. Therefore, the potential difference between the preceding stage and the subsequent stage of the backflow prevention unit 120 may be eliminated at a predetermined timing by controlling to cancel the rectifying action of the backflow prevention unit 120. Consequently, cancellation of the rectifying action of the backflow prevention unit 120 allows the current blocked by the backflow prevention unit 120 to flow to the power supply unit 130, so that the back electromotive force generated in the motor unit 110 can be regenerated in the power supply unit 130.

The potential detection unit 140 detects each of the potentials at the preceding stage and the subsequent stage of the backflow prevention unit 120. Specifically, the potential detection unit 140 may include a voltmeter that detects each of potentials of circuits at the preceding stage and the subsequent stage of the backflow prevention unit 120, or may include a potentiometer that detects a potential difference between the preceding stage and the subsequent stage of the backflow prevention unit 120 using a potential at the preceding stage of the backflow prevention unit 120 as reference. Consequently, the potential detection unit 140 can detect an increase in the potential at the subsequent stage of the backflow prevention unit 120 caused by the current blocked by the backflow prevention unit 120.

Note that the potential detection unit 140 may detect an increasing speed of the potential at the subsequent stage of the backflow prevention unit 120 by detecting each of the potentials at the preceding stage and the subsequent stage of the backflow prevention unit 120 at predetermined intervals. In such a case, the external force detection unit 150 at the subsequent stage can infer the magnitude of the applied external force by considering the increasing speed of the potential at the subsequent stage of the backflow prevention unit 120 and the magnitude of a torque output by the motor unit 110.

The external force detection unit 150 detects an external force applied to the link connected to the joint 100 on the basis of the detected potentials at the preceding stage and the subsequent stage of the backflow prevention unit 120. Specifically, the external force detection unit 150 detects the external force to the link connected to the joint 100 by detecting a difference between the detected potentials of the preceding stage and the subsequent stage of the backflow prevention unit 120. For example, the external force detection unit 150 may be an arithmetic device such as a central processing unit (CPU), a micro-processing unit (MPU), or a control integrated circuit (IC).

For example, the external force detection unit 150 may determine that an external force has been applied to the link connected to the joint 100 in a case where the potential at the subsequent stage of the backflow prevention unit 120 becomes higher than the potential at the preceding stage of the backflow prevention unit 120 by a threshold or more. Note that the threshold is set, in consideration of the possibility that the potential at the subsequent stage of the backflow prevention unit 120 becomes higher than the potential at the preceding stage of the backflow prevention unit 120 due to noise or the like, in order to prevent the external force detection unit 150 from erroneously detecting the noise as an external force. Therefore, the threshold may be set at any value, but may not necessarily be set depending on a circuit configuration.

Furthermore, the external force detection unit 150 may determine the magnitude of the applied external force on the basis of the increasing speed of the potential at the subsequent stage of the backflow prevention unit 120 and the torque output from the motor unit 110. Specifically, the larger the external force applied to the link connected to the joint 100, the larger the back electromotive force generated in the motor unit 110 and the higher the increasing speed of the potential at the subsequent stage of the backflow prevention unit 120. Therefore, the external force detection unit 150 can estimate the magnitude of the external force applied to the link connected to the joint 100 by calculating the increasing speed of the potential at the subsequent stage of the backflow prevention unit 120 and combining information regarding the torque output from the motor unit 110 therewith.

The control unit 160 drives the motor unit 110 on the basis of a command from a control device or the like of the robotic device 1 provided with the joint 100. For example, the external force detection unit 150 may be an arithmetic device such as a central processing unit (CPU), a microprocessing unit (MPU), or a control integrated circuit (IC). Specifically, the control unit 160 may control a torque generated by the motor unit 110 on the basis of the command from the control device or the like of the robotic device 1. That is, the control unit 160 may drive the motor unit 110 by so-called torque control. However, it goes without saying that the control unit 160 may drive the motor unit 110 by position control in which the link connected to the joint 100 is moved to an indicated position.

For example, in a case where the robotic device 1 is a life-connected type support robot that supports daily activities of a user, the magnitude of a force exercised by the robotic device 1 can be limited in order not to damage the user or the external environment. Therefore, such a life-connected type robotic device 1 can be driven by torque control in which it is easy to control the magnitude of the force to be exercised. The sensor device according to the present embodiment can detect that an external force is applied regardless of a method of controlling the motor that drives the joint 100, and therefore can be applied also to such a torque-controlled life-connected type robotic device 1.

As described above, the sensor device according to the present embodiment can detect the back electromotive force generated in the motor unit 110 by the external force applied to the link or the like connected to the joint 100 as a potential difference between the preceding stage and the subsequent stage of the backflow prevention unit 120. The sensor device according to the present embodiment can detect the external force without using a sensor such as a force sensor or a contact sensor, so that the structure of the robotic device 1 can be simplified and manufacturing cost can be reduced. Furthermore, in the sensor device according to the present embodiment, a small current value generated by a small external force can be converted into an easily detectable potential difference by time integration, and therefore, detection sensitivity for the external force can be improved.

<3. Specific Example>

Figure 4:
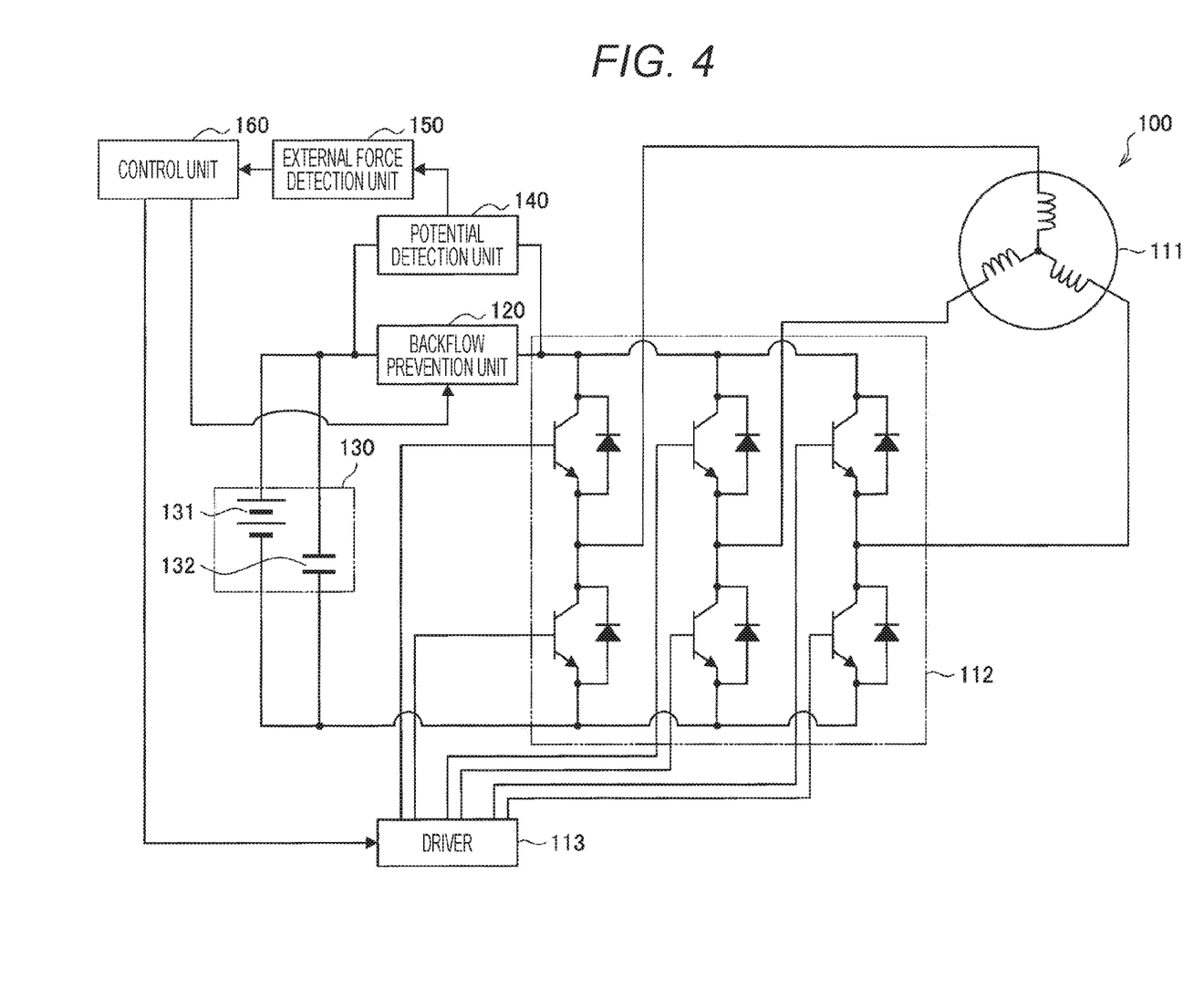
FIG. 4 is an explanatory diagram illustrating an example of a more specific configuration of the joint including the sensor device according to the embodiment.

Subsequently, a specific example of a joint including the sensor device according to the present embodiment will be described with reference to FIG. 4. FIG. 4 is an explanatory diagram illustrating an example of a more specific configuration of the joint including the sensor device according to the present embodiment.

As illustrated in FIG. 4, the joint 100 includes a battery 131, a capacitor 132, a motor 111, an inverter circuit 112, a driver 113, the backflow prevention unit 120, the potential detection unit 140, the external force detection unit 150, and the control unit 160. Note that the backflow prevention unit 120, the potential detection unit 140, the external force detection unit 150, and the control unit 160 have configurations substantially similar to those described with reference to FIG. 3, and thus descriptions thereof will be omitted here.

The battery 131 is a direct-current power supply that can supply a direct-current, and may be, for example, a lithium ion secondary battery. However, the battery 131 may be a primary battery or a secondary battery other than the above. The battery 131 stores a larger amount of electric power than the capacitor 132, and functions as a main power supply for driving the motor 111.

The capacitor 132 is a passive element capable of storing and discharging electric power by means of a capacitance. The capacitor 132 may be, for example, an electrolytic capacitor or an electric double layer capacitor that enables relatively large capacity of storage. The capacitor 132 stores and discharges electric power more easily than the battery 131, and thus functions as a power storage device that stores the back electromotive force generated in the motor 111.

The battery 131 and the capacitor 132 constitute the power supply unit 130, for example, by being connected in parallel with each other. Consequently, the power supply unit 130 can store the back electromotive force generated in the motor 111 in the capacitor 132, and can use the electric power stored in the capacitor 132 together with the electric power in the battery 131 to drive the motor 111.

The motor 111 converts electric energy into mechanical energy of rotation. The motor 111 may be, for example, a three-phase alternating-current motor that supplies a three-phase alternating current to three coils, thereby generating a rotating magnetic field and rotating a rotor connected to a rotating shaft. The three-phase alternating-current motor has high versatility, and therefore can be applied as the motor 111 for various joints 100. However, depending on a device to which the joint 100 is applied or the use of the joint 100, the motor 111 may be another alternating-current motor or a direct-current motor.

The inverter circuit 112 is a circuit that converts a direct current into an alternating current. Specifically, the inverter circuit 112 is a circuit using two sets of switching elements for each phase, and converts a direct-current supplied from the power supply unit 130 into a three-phase alternating current that can be supplied to the motor 111. The inverter circuit 112 is provided in order to convert characteristics of a current supplied by the power supply unit 130 into characteristics of a current that can be supplied to the motor 111. Therefore, depending on the types of the power supply unit 130 and the motor 111, the inverter circuit 112 may be provided in another circuit configuration or may not be provided.

The driver 113 causes the motor 111 to generate a desired torque by driving the inverter circuit 112 on the basis of a torque command indicated by the control unit 160. Specifically, the driver 113 controls each switching element of the inverter circuit 112 on the basis of the torque command indicated by the control unit 160 to generate a three-phase alternating current with any voltage and frequency, thereby causing the motor 111 to generate the desired torque. The driver 113 may be, for example, a control IC provided in the motor 111 and the inverter circuit 112.

The motor 111, the inverter circuit 112, and the driver 113 constitute the motor unit 110. Here, the backflow prevention unit 120 is provided at a preceding stage of the inverter circuit 112, and the potential detection unit 140 detects a potential between the backflow prevention unit 120 and the inverter circuit 112 as a potential at the subsequent stage of the backflow prevention unit 120. However, the configurations of the motor 111 and the inverter circuit 112 may be appropriately changed depending on a device to which the joint 100 is applied or the use of the joint 100.

<4. Control Examples>

Figure 5:
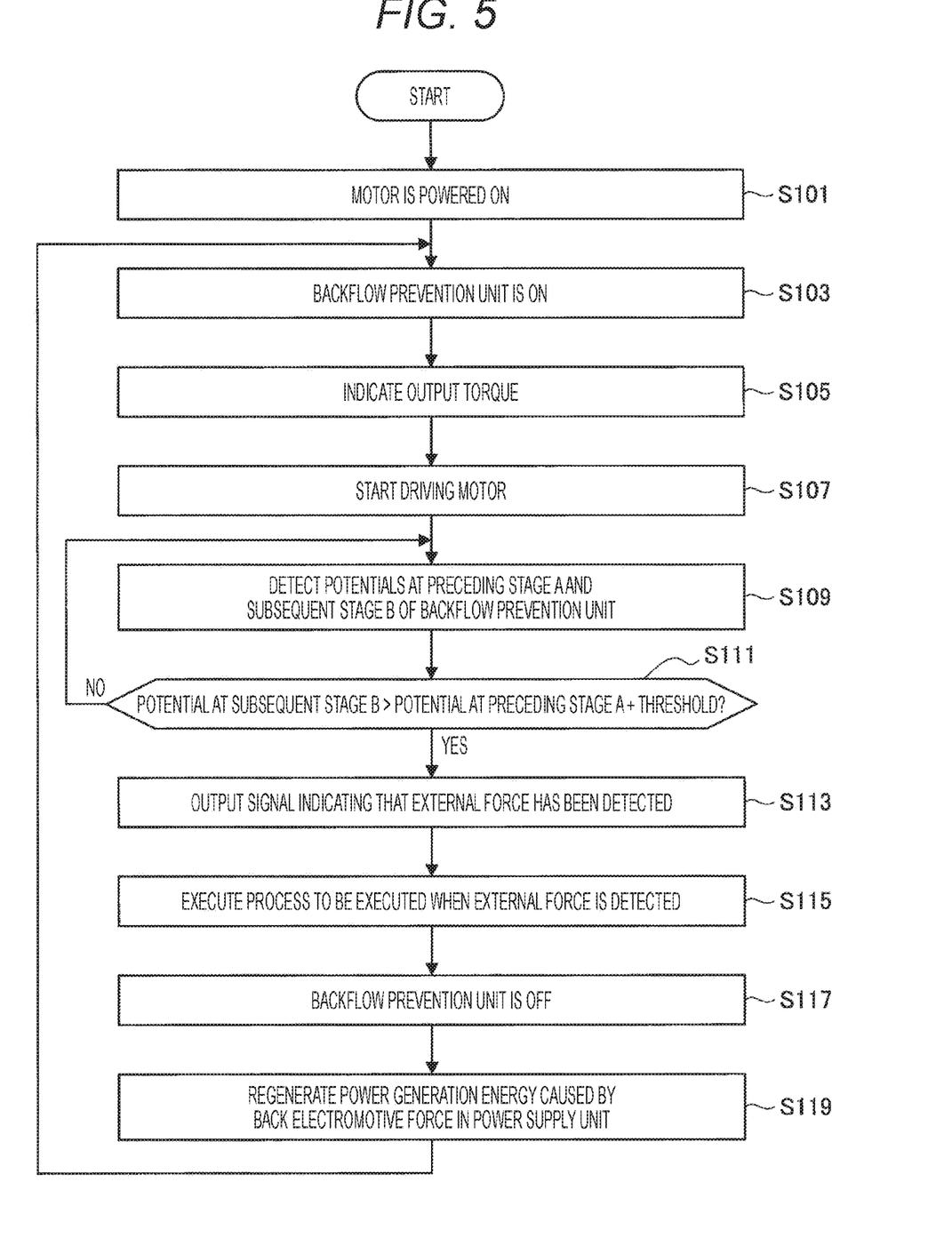
FIG. 5 is a flowchart illustrating a first control example of the sensor device according to the embodiment.
Figure 6:
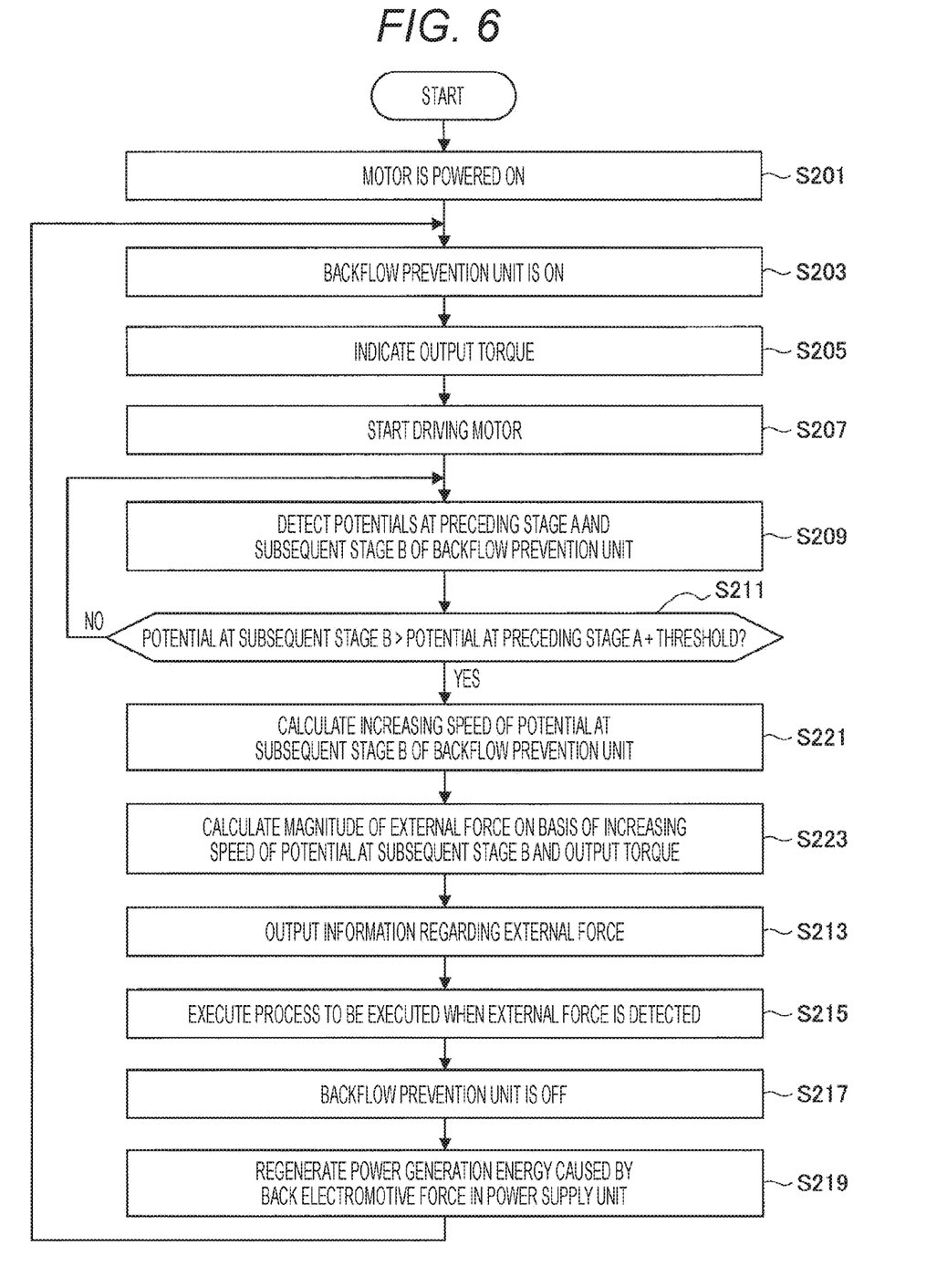
FIG. 6 is a flowchart illustrating a second control example of the sensor device according to the embodiment.

Moreover, control examples of the sensor device according to the present embodiment will be described with reference to FIGS. 5 and 6. FIG. 5 is a flowchart illustrating a first control example of the sensor device according to the present embodiment. FIG. 6 is a flowchart illustrating a second control example of the sensor device according to the present embodiment.

(4.1 First Control Example)

The first control example of the sensor device according to the present embodiment is a control example in which an external force is detected on the basis of each of potentials at the preceding stage and the subsequent stage of the backflow prevention unit 120.

As illustrated in FIG. 5, first, the motor unit 110 is powered up (S101), and the rectifying action of the backflow prevention unit 120 is enabled (S103). Thereafter, a torque to be output by the motor unit 110 is indicated by the control unit 160 (S105), and the motor unit 110 starts being driven to generate the indicated torque (S107).

At that time, the potential detection unit 140 detects each of potentials at the preceding stage and the subsequent stage of the backflow prevention unit 120 at a predetermined timing (S109). Here, the external force detection unit 150 determines, on the basis of the detected potentials, whether or not the potential at the subsequent stage of the backflow prevention unit 120 is higher than a value obtained by adding a threshold to the potential at the preceding stage of the backflow prevention unit 120 (S111). If the potential at the subsequent stage of the backflow prevention unit 120 is equal to or lower than the value obtained by adding the threshold to the potential at the preceding stage of the backflow prevention unit 120 (S111/No), the external force detection unit 150 continues to cause the potential detection unit 140 to detect the potentials at the preceding stage and the subsequent stage of the backflow prevention unit 120 (S109).

On the other hand, if the potential at the subsequent stage of the backflow prevention unit 120 is higher than the value obtained by adding the threshold to the potential at the preceding stage of the backflow prevention unit 120 (S111/Yes), the external force detection unit 150 outputs a signal indicating that an external force has been detected (S113). On the basis of the above, the control unit 160 executes a process set to be executed when an external force is detected (S115). For example, the control unit 160 may execute a process of stabilizing a posture of the robotic device 1, a process of reducing an excessive torque in the motor unit 110, or the like.

Thereafter, the control unit 160 disables the rectifying action of the backflow prevention unit 120 (S117). Therefore, the potentials at the preceding stage and the subsequent stage of the backflow prevention unit 120 are reset to an equal potential, and the back electromotive force blocked by the backflow prevention unit 120 is regenerated in the power supply unit 130 (S119). Moreover, the control unit 160 enables the rectifying action of the backflow prevention unit 120 (S103), thereby continuing to enable the external force detection unit 150 to detect the external force.

With the above control, the sensor device according to the present embodiment can detect the external force applied to the link or the like connected to the joint 100. Specifically, the sensor device according to the present embodiment can detect the external force that causes the motor unit 110 to generate the back electromotive force as a potential difference between the preceding stage and the subsequent stage of the backflow prevention unit 120.

(4.2 Second Control Example)

The second control example of the sensor device according to the present embodiment is a control example in which the magnitude of an external force is determined on the basis of an increasing speed of a potential at the subsequent stage of the backflow prevention unit 120 and a torque output from the motor unit 110.

As illustrated in FIG. 6, first, the motor unit 110 is powered up (S201), and the rectifying action of the backflow prevention unit 120 is enabled (S203). Thereafter, a torque to be output by the motor unit 110 is indicated by the control unit 160 (S205), and the motor unit 110 starts being driven to generate the indicated torque (S207).

At that time, the potential detection unit 140 detects each of potentials at the preceding stage and the subsequent stage of the backflow prevention unit 120 at a predetermined timing (S209). Here, the external force detection unit 150 determines, on the basis of the detected potentials, whether or not the potential at the subsequent stage of the backflow prevention unit 120 is higher than a value obtained by adding a threshold to the potential at the preceding stage of the backflow prevention unit 120 (S211). If the potential at the subsequent stage of the backflow prevention unit 120 is equal to or lower than the value obtained by adding the threshold to the potential at the preceding stage of the backflow prevention unit 120 (S211/No), the external force detection unit 150 continues to cause the potential detection unit 140 to detect the potentials at the preceding stage and the subsequent stage of the backflow prevention unit 120 (S209).

On the other hand, if the potential at the subsequent stage of the backflow prevention unit 120 is higher than the value obtained by adding the threshold to the potential at the preceding stage of the backflow prevention unit 120 (S211/Yes), the external force detection unit 150 calculates an increasing speed of the potential at the subsequent stage of the backflow prevention unit 120 (S221). Subsequently, the external force detection unit 150 calculates the magnitude of the external force on the basis of the increasing speed of the potential at the subsequent stage of the backflow prevention unit 120 and the torque output from the motor unit 110 (S223). Next, the external force detection unit 150 outputs information including the calculated magnitude of the external force (S213). On the basis of the above, the control unit 160 executes a process set to be executed when an external force is detected (S215). For example, the control unit 160 may perform a process of stabilizing a posture of the robotic device 1, a process of reducing an excessive torque in the motor unit 110, or the like.

Thereafter, the control unit 160 disables the rectifying action of the backflow prevention unit 120 (S217). Therefore, the potentials at the preceding stage and the subsequent stage of the backflow prevention unit 120 are reset to an equal potential, and the back electromotive force blocked by the backflow prevention unit 120 is regenerated in the power supply unit 130 (S219). Moreover, the control unit 160 enables the rectifying action of the backflow prevention unit 120 (S203), thereby continuing to enable the external force detection unit 150 to detect the external force.

With the above control, the sensor device according to the present embodiment can detect the external force applied to the link or the like connected to the joint 100, and can calculate the magnitude of the detected external force. Specifically, the sensor device according to the present embodiment can detect the magnitude of the external force that causes the motor unit 110 to generate the back electromotive force as an increasing speed of the potential at the subsequent stage of the backflow prevention unit 120.

<5. Examples of Application>

Hereinafter, examples of application of the sensor device according to the present embodiment will be described.

For example, the sensor device according to the present embodiment can calculate the magnitude of the external force applied to the link or the like connected to the joint 100, as described in the second control example above. That is, the sensor device according to the present embodiment can be used as a force sensor. Specifically, the larger the external force that rotates the motor unit 110, the larger the back electromotive force generated in the motor unit 110 and the faster the increasing speed of the potential at the subsequent stage of the backflow prevention unit 120. Therefore, the sensor device according to the present embodiment can calculate the magnitude of the detected external force by calculating, from the detected potential at the subsequent stage of the backflow prevention unit 120, the increasing speed of the potential.

Furthermore, for example, the sensor device according to the present embodiment can be applied to the robotic device 1 to be loaded with luggage or the like, and can be used for determination whether or not luggage is loaded. Specifically, regarding the robotic device 1 whose posture is stabilized by causing each motor unit 110 that controls the joint 100 to generate a torque, in a case where an arm portion or the like of the robotic device 1 is loaded with luggage, the back electromotive force is generated in the motor unit 110 that corresponds to a location of the loading. Here, it is possible to determine whether or not the robotic device 1 is loaded with luggage by detecting the back electromotive force generated by the loading of the luggage with the sensor device according to the present embodiment. Furthermore, in a case where the sensor device according to the present embodiment calculates the magnitude of the external force described above as well, the sensor device can calculate the weight of the luggage loaded on the robotic device 1 as well.

Moreover, for example, the sensor device according to the present embodiment can determine whether or not an unexpected collision or the like has occurred by referring to an action plan. Specifically, in a case where the robotic device 1 generates an action plan, the external force detection unit 150 can predict, by referring to the action plan, timing of contact or an external force occurring along the action plan. Therefore, in a case where contact or an external force is detected at timing that is unforeseen from the action plan, the external force detection unit 150 can determine that an unforeseen collision or the like has occurred with respect to a part or the whole of the robotic device 1.

The preferred embodiment of the present disclosure has been described in detail with reference to the accompanying drawings. However, the technical scope of the present disclosure is not limited to the above examples. A person having ordinary knowledge in a technical field of the present disclosure may obviously find various alterations and modifications within the scope of the technical ideas described in the appended claims, and it should be understood that they will naturally come under the technical scope of the present disclosure.

Furthermore, the effects described in the present description are explanatory or illustrative ones, and are not limitative ones. That is, the technique according to the present disclosure can achieve other effects that are apparent to those skilled in the art from the statement in the present description in addition to or instead of the effects described above.

Note that the following configurations also belong to the technical scope of the present disclosure.

(1)

A sensor device including:

a backflow prevention unit provided in the middle of a circuit that supplies a current from a power supply unit to a motor unit;

a potential detection unit configured to detect each of potentials at a preceding stage and a subsequent stage of the backflow prevention unit; and an external force detection unit configured to detect an external force applied to a member connected to the motor unit on the basis of the potentials at the preceding stage and the subsequent stage of the backflow prevention unit.

(2)

The sensor device according to the above-described (1), in which the external force detection unit detects the external force by comparing the potential at the preceding stage of the backflow prevention unit with the potential at the subsequent stage of the backflow prevention unit.

(3)

The sensor device according to the above-described (2), in which the external force detection unit detects the external force in a case where the potential at the subsequent stage of the backflow prevention unit is higher than the potential at the preceding stage of the backflow prevention unit by a threshold or more.

(4)

The sensor device according to any one of the above-described (1) to (3), in which the backflow prevention unit prevents a current from flowing from the motor unit to the power supply unit.

(5)

The sensor device according to the above-described (4), in which a current flowing from the motor unit to the power supply unit is generated by a back electromotive force in the motor unit caused by the external force.

(6)

The sensor device according to the above-described (4) or (5), in which the backflow prevention unit is provided so as to be able to control whether or not to prevent a current from flowing from the motor unit to the power supply unit.

(7)

The sensor device according to the above-described (6), in which in a case where the external force is detected by the external force detection unit, the backflow prevention unit permits a current to flow from the motor unit to the power supply unit.

(8)

The sensor device according to any one of the above-described (1) to (7), in which the external force detection unit further calculates an increasing speed of the potential at the subsequent stage of the backflow prevention unit, and calculates a magnitude of the external force on the basis of the increasing speed and an output torque of the motor unit.

(9)

The sensor device according to any one of the above-described (1) to (8), in which rotation of the motor unit is controlled by torque control.

(10)

The sensor device according to any one of the above-described (1) to (9), in which the motor unit includes a three-phase alternating-current motor.

(11)

The sensor device according to any one of the above-described (1) to (10), in which the power supply unit includes a direct-current power supply.

(12)

The sensor device according to any one of the above-described (1) to (11), in which the power supply unit includes at least either of a battery or a capacitor.

(13)

The sensor device according to the above-described (10), in which an inverter circuit is further provided in the middle of a circuit that supplies a current from the power supply unit to the three-phase alternating-current motor, and the backflow prevention unit is provided at a preceding stage of the inverter circuit.

(14)

The sensor device according to any one of the above-described (1) to (13), in which the motor unit rotates a joint of a robotic device.

(15)

The sensor device according to the above-described (14), in which the joint is provided to an arm portion or a leg portion of the robotic device.

(16)

A sensing method including:

detecting each of potentials at a preceding stage and a subsequent stage of a backflow prevention unit provided in the middle of a circuit that supplies a current from a power supply unit to a motor unit; and detecting an external force applied to a member connected to the motor unit on the basis of the potentials at the preceding stage and the subsequent stage of the backflow prevention unit.

REFERENCE SIGNS LIST

1 Robotic device
10 Torso portion
11 Arm portion
12 Leg portion
100 Joint
110 Motor unit
111 Motor
112 Inverter circuit
113 Driver
120 Backflow prevention unit
130 Power supply unit
131 Battery
132 Capacitor
140 Potential detection unit
150 External force detection unit
160 Control unit

The invention claimed is:

1. A sensor device, comprising:
a backflow prevention unit provided in a middle of a circuit that supplies a current from a power supply unit to a motor unit;
a potential detection unit configured to detect a potential at a preceding stage and a potential at a subsequent stage of the backflow prevention unit; and
an external force detection unit configured to detect an external force applied to a member connected to the motor unit on a basis of the potential at the preceding stage and the potential at the subsequent stage of the backflow prevention unit.

2. The sensor device according to claim 1, wherein the external force detection unit detects the external force by comparing the potential at the preceding stage of the backflow prevention unit with the potential at the subsequent stage of the backflow prevention unit.

3. The sensor device according to claim 2, wherein the external force detection unit detects the external force in a case where the potential at the subsequent stage of the backflow prevention unit is higher than the potential at the preceding stage of the backflow prevention unit by a threshold or more.

4. The sensor device according to claim 1, wherein the backflow prevention unit prevents a current from flowing from the motor unit to the power supply unit.

5. The sensor device according to claim 4, wherein the current flowing from the motor unit to the power supply unit is generated by a back electromotive force in the motor unit caused by the external force.

6. The sensor device according to claim 4, wherein the backflow prevention unit is provided so as to be able to control whether or not to prevent the current from flowing from the motor unit to the power supply unit.

7. The sensor device according to claim 6, wherein in a case where the external force is detected by the external force detection unit, the backflow prevention unit permits the current to flow from the motor unit to the power supply unit.

8. The sensor device according to claim 1, wherein the external force detection unit further calculates an increasing speed of the potential at the subsequent stage of the backflow prevention unit, and calculates a magnitude of the external force on a basis of the increasing speed and an output torque of the motor unit.

9. The sensor device according to claim 1, wherein rotation of the motor unit is controlled by torque control.

10. The sensor device according to claim 1, wherein the motor unit includes a three-phase alternating-current motor.

11. The sensor device according to claim 10,
wherein an inverter circuit is further provided in the middle of the circuit that supplies the current from the power supply unit to the three-phase alternating-current motor, and
the backflow prevention unit is provided at a preceding stage of the inverter circuit.

12. The sensor device according to claim 1, wherein the power supply unit includes a direct-current power supply.

13. The sensor device according to claim 1, wherein the power supply unit includes at least either of a battery or a capacitor.

14. The sensor device according to claim 1, wherein the motor unit rotates a joint of a robotic device.

15. The sensor device according to claim 14, wherein the joint is provided to an arm portion or a leg portion of the robotic device.

16. A sensing method comprising:
detecting a potential at a preceding stage and a potential at a subsequent stage of a backflow prevention unit provided in a middle of a circuit that supplies a current from a power supply unit to a motor unit; and
detecting an external force applied to a member connected to the motor unit on a basis of the potential at the preceding stage and the potential at the subsequent stage of the backflow prevention unit.

* * * * *